(12) United States Patent
Boutwell et al.

(10) Patent No.: US 6,453,030 B1
(45) Date of Patent: Sep. 17, 2002

(54) SYSTEM AND METHOD FOR ROAMING BILLING

(75) Inventors: Juanita Boutwell, Redwood City, CA (US); Mike Vargo, Redwood City, CA (US)

(73) Assignee: Clarent Corporation, Redwood City, CA (US)

( * ) Notice: Subject to any disclaimer, the term of this patent is extended or adjusted under 35 U.S.C. 154(b) by 83 days.

(21) Appl. No.: 09/733,446

(22) Filed: Dec. 7, 2000

(51) Int. Cl.[7] .......................... H04M 15/00; H04Q 7/20

(52) U.S. Cl. .............................. 379/114.2; 379/114.15; 379/126; 379/121.01; 455/432; 455/433

(58) Field of Search ...................... 379/114.01, 114.03, 379/114.14, 114.17, 114.19, 114.21, 114.26, 115.01, 115.02, 115.03, 121.01, 121.04, 121.05, 126, 127.02, 127.04, 91.01, 114.15, 114.16; 455/405, 406, 432, 433, 560, 435

(56) References Cited

U.S. PATENT DOCUMENTS

| 5,579,379 | A | * | 11/1996 | D'Amico et al. | 379/112 |
|---|---|---|---|---|---|
| 5,673,306 | A | * | 9/1997 | Amadon et al. | 379/114 |
| 5,732,127 | A | * | 3/1998 | Hayes | 379/115 |
| 5,758,281 | A | * | 5/1998 | Emery et al. | 455/428 |
| 5,805,997 | A | * | 9/1998 | Farris | 455/461 |
| 5,845,211 | A | * | 12/1998 | Roach, Jr. | 455/436 |
| 5,873,030 | A | * | 2/1999 | Mechling et al. | 455/408 |
| 6,047,179 | A | * | 4/2000 | Kirby | 455/432 |
| 6,070,070 | A | * | 5/2000 | Ladue | 379/220 |
| 6,236,852 | B1 | * | 5/2001 | Veerasamy et al. | 455/411 |
| 6,253,081 | B1 | * | 6/2001 | Koster | 455/433 |
| 6,373,817 | B1 | * | 4/2002 | Kung et al. | 370/217 |
| 6,374,102 | B1 | * | 4/2002 | Brachman et al. | 455/422 |

* cited by examiner

*Primary Examiner*—Rexford Barnie
(74) *Attorney, Agent, or Firm*—Carr & Ferrell LLP

(57) ABSTRACT

A system and method for managing roaming billing records for a telephone caller's home subscriber network. The invention includes a method for roaming networks to push roaming billing records in real time back to a subscriber's home network.

1 Claim, 4 Drawing Sheets

| DATABASE ID | ROAMING PARTNER NETWORK NAME | COMMAND CENTER IP ADDRESS |
|---|---|---|
| 1 | CHINA | 10.1.1.2 |
| 1 | CHINA | 10.1.1.4 |
| 2 | FRANCE | 10.1.7.8 |
| 2 | FRANCE | 10.1.7.10 |
| 3 | USA | 10.2.1.5 |
| 3 | USA | 102.4.2.8 |
| 3 | USA | 10.3.5.10 |
| 3 | USA | 22.6.10.9 |
| 3 | USA | 101.2.9.6 |

FIG. 4

SYSTEM AND METHOD FOR ROAMING BILLING

BACKGROUND OF THE INVENTION

1. Field of the Invention

The present invention relates generally to roaming telephone network subscriber calls, or long distance and/or prepaid phone card calls, and more particularly to management of subscriber home network billing records corresponding to roaming telephone network subscribers' telephone calls.

2. Description of the Background Art

The introduction of telephone network subscriber cards (i.e., phone cards) has allowed people to communicate by telephone when away from a home or office telephone, such as while traveling, even in other parts of the world. A telephone network subscriber does not need to use a cell telephone, and the subscriber will accrue telephone charges that must be reconciled by the subscriber's home network. Regardless of where in the world a telephone network telephone subscriber is, the subscriber can place a call and have that call appear on the subscriber's long distance bill. The subscriber dials a special telephone number (i.e., an ingress gateway) associated with the roaming network, the subscriber enters a personal identification number (PIN) and password associated with the subscriber's telephone to authenticate the call, and then the call is placed.

In scenarios in which roaming occurs, billing record management may become very complex and time-consuming. Complexity increases when partner networks are involved in the calling scenario along with a roaming network and a subscriber's home network. In addition, prepaid phone cards are becoming more prevalent, especially outside of the United States. Without a telephone roaming feature, purchasers of phone cards are limited to only one location. Telephone networks also offer phone cards with long distance features that may or may not be prepaid.

In prior art systems a subscriber's home network must regularly poll partner networks to obtain billing records. This is true even for those networks that may have the extremes of zero or many transactions to harvest. Additionally, a local network must post only one transaction at a time.

Therefore, there remains a need for an improved system and method for a subscriber's home network to quickly and efficiently manage roaming billing records.

SUMMARY OF THE INVENTION

The present invention provides a system and method for managing roaming billing records for a phone card caller's home subscriber network. The invention includes a method for roaming networks to push roaming billing records in real time back to a subscriber's home network.

The method of processing roaming billing record information from a roaming network begins with a telephone network subscriber initiating a telephone call that is routed to an ingress gateway. The subscriber's database identification (ID) is determined during subscriber authentication. The call is set up, connected and completed. The ingress gateway then sends its billing information to its Command Center in the roaming network. The Command Center reviews the billing information, stores a corresponding billing record in a local database, and compares the subscriber's database ID to its own database ID. If the two ID's are different then the Command Center searches a list of "Roaming Partner Networks," their associated database ID's, and a list of Command Centers in each network, and forwards a copy, within an acknowledgement (ACK) message, to a Command Center in the home network of the telephone network subscriber. The Command Center in the home network marks the billing record as a"roaming copy" billing record, saves the billing record to a local database, and sends an acknowledgement (ACK) message to the roaming network Command Center.

Other advantages and features of the present invention will be apparent from the drawings and detailed description as set forth below.

BRIEF DESCRIPTION OF THE DRAWINGS

FIG. 4 is a database table located in a database of a roaming network Command Center.

DETAILED DESCRIPTION OF THE PREFERRED EMBODIMENT

The present invention relates to an improved system and method of managing roaming billing records for a phone card caller's home subscriber network.

A roaming telephone network subscriber is authenticated at his home network in real time as a preliminary step in placing a call. Upon completion of the call, the billing record is stored on the local network and is also immediately pushed back to the subscriber's home network. The subscriber's home network keeps customer balances up-to-date while the customer is roaming and there is no need for a subscriber's home network to repeatedly poll local networks to harvest bills.

Pushing roaming billing records in real time back to a subscriber's home network helps to avoid network congestion. In the prior art, a local network must post one transaction at a time and the subscriber's home network must poll local networks, even those local networks that may have the extremes of zero or many transactions to harvest. Additionally, customer balances remain up-to-date even while the customer is roaming.

Figure 1:
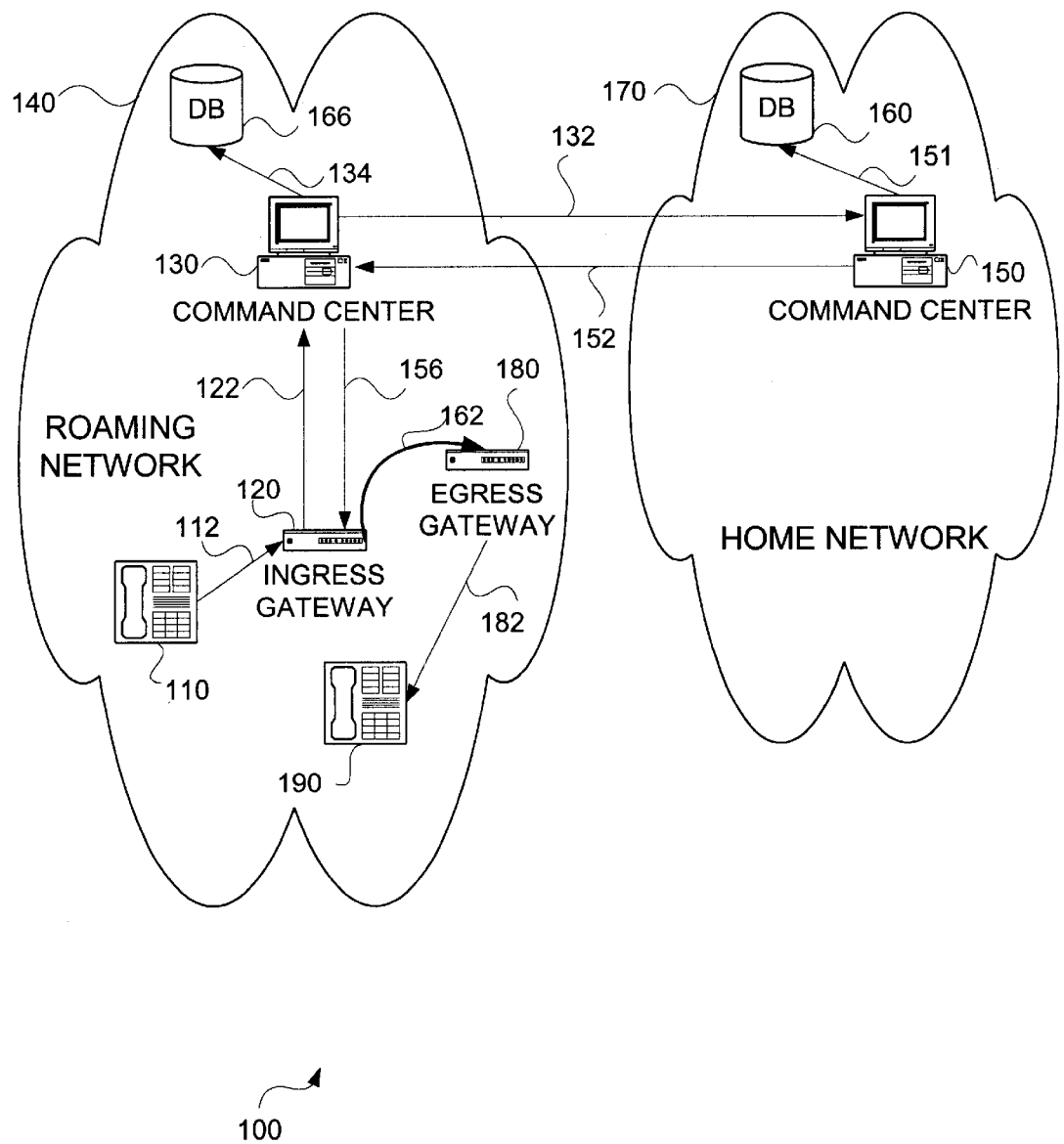
FIG. 1 is a network diagram of a supported roaming scenario in which both the source (ingress) gateway and the destination (egress) gateway reside in the roaming network, i.e., both the source network and the destination network are the roaming network.

FIG. 1 is a diagram of a roaming network 140 and a home network 170 that support a roaming scenario. The roaming network 140 includes both a source (ingress) gateway 120 and a destination (egress) gateway 180.

A phone card telephone 110 (i.e., a telephone used by a telephone network subscriber to the home network 170, subscriber not shown) initiates a call that is routed for authentication via signal path 112 to ingress gateway 120. Ingress gateway 120, via signal path 122, requests authentication from Command Center 130. The Command Center 130, in turn, requests authentication information via signal path 132 to a Command Center 150 in the home network 170 corresponding to authentication information of the subscriber at phone card telephone 110. Command Center 150 returns its response with authentication information via signal path 152 back to Command Center 130 in roaming network 140. Command Center 130 returns the response authentication information via signal path 156 to ingress gateway 120.

After authentication, ingress gateway 120 connects via telephone signal path 162 to the egress gateway 180 for call setup and signaling. Finally, egress gateway 180 completes the call connection via signal path 182 to the destination telephone 190.

Since the phone card telephone 110 in roaming network 140 is calling a destination telephone 190 within the same roaming network 140, home network 170 does not need a gateway for call completion and therefore no gateway is depicted in the home network 170, although each network typically does have gateways.

After the calling and called parties have completed the call, the billing sequence proceeds. Ingress gateway 120 sends the billing record information via signal path 122 to Command Center 130, which reviews the billing information and sends (i.e., pushes) the billing record information via signal path 132 to Command Center 150 and, at nearly the same time, also sends an acknowledgment (ACK) message via signal path 156 to ingress gateway 120.

The Command Center 130 does not wait for the home network 170 to respond before pushing the billing record information and ACK message back to the ingress gateway 120.

Command Center 150, upon receipt of the billing record information, then sends its ACK message via signal path 152 back to Command Center 130. In addition, the billing information on signal path 132 is identical to the billing information on signal path 122. The ACK messages on signal paths 152 and 156 are completely independent. The ACK message on signal path 152 acknowledges that Command Center 150 stored the billing record information successfully. The ACK message on signal path 156 acknowledges that Command Center 130 stored the billing record information successfully.

In this two-network scenario, Command Center 130 in the roaming network 140 marks the ingress billing record information as an "inbound" billing record. The Command Center 130 in the roaming network makes a copy of the billing record and pushes it via signal path 132 to Command Center 150 in the home network 170. Command Center 150 in home network 170 then marks its copy of the billing record information as a "roaming copy" billing record. Once Command Centers 130 and 150 receive the billing record information they save the information by making a function call through signal paths 134 and 151, respectively, to store the billing record information in databases 166 and 160, respectively.

The ACK messages indicate that the billing records reached their intended destinations and that there is no need to resend the data. If an error were to occur, a Command Center 130 or 150 would set an error flag in the ACK message indicating that the billing record was not processed properly or not processed at all. An error may occur, for instance, if a Command Center 130 or 150 does not allow roaming, or if the Command Center does not recognize the phone card telephone 110 network subscriber, in which case authentication fails. In addition, there may be an error if the billing record simply was not processed or if the billing record never reached a Command Center 130 or 150 or a database 144 or 160. This might happen, for instance, in the event of a computer crash or a network component or line failure. The error flag is in the form of a field indicating lack of success, and is part of the ACK message. If no error occurs, this field is set to "success."

Figure 2:
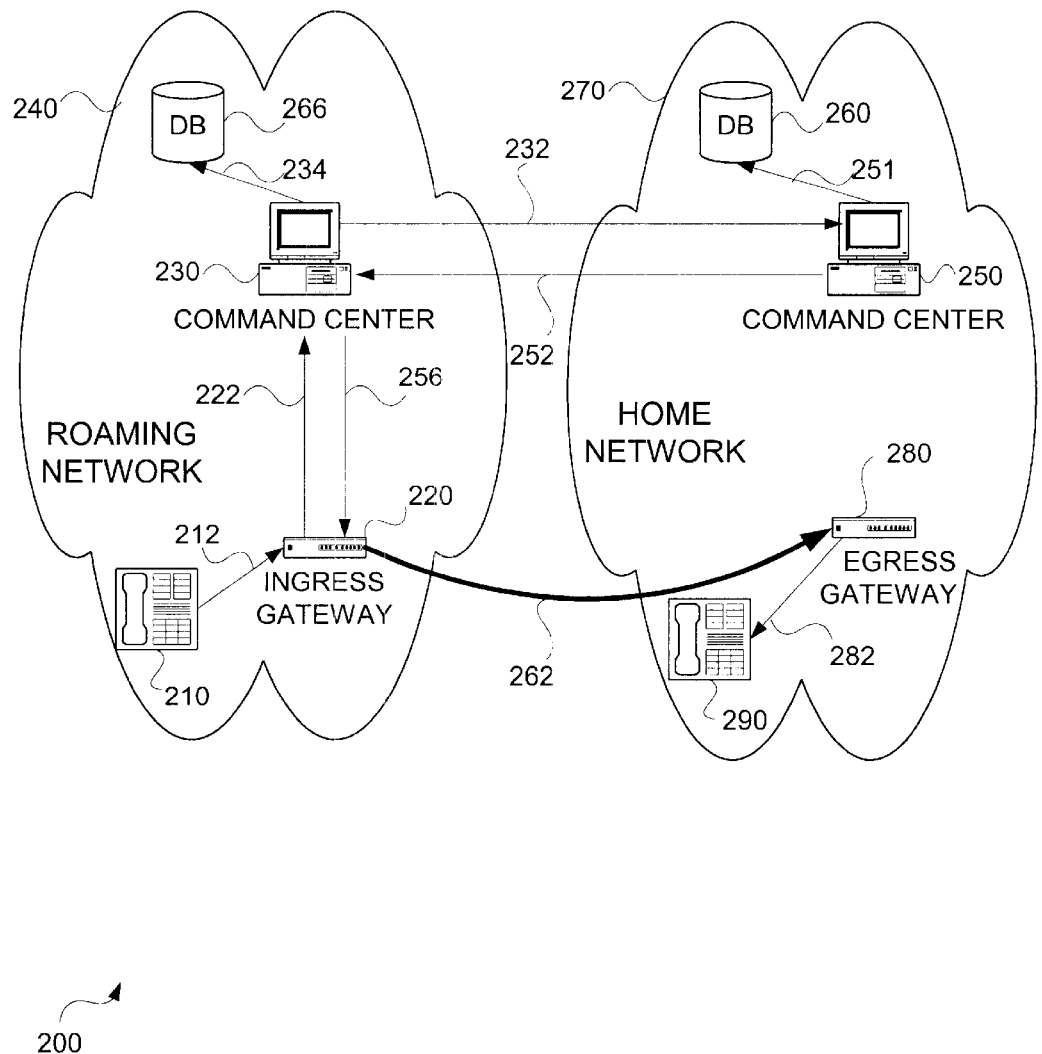
FIG. 2 is a network diagram of a supported roaming scenario in which the source (ingress) gateway resides in the roaming network and the destination (egress) gateway resides in the home network.

FIG. 2 is a diagram of a roaming network 240 and a home network 270 that support a roaming scenario. The roaming network 240 includes a source (ingress) gateway 220 and the home network 270 includes a destination (egress) gateway 280.

A phone card telephone 210 (i.e., a telephone used by a telephone network subscriber to the home network 270, subscriber not shown) initiates a call that is routed for authentication via signal path 212 to ingress gateway 220. Ingress gateway 220, via signal path 222, requests authentication from Command Center 230. The Command Center 230, in turn, requests authentication information via signal path 232 to a Command Center 250 in the home network 270 corresponding to authentication information of the subscriber at phone card telephone 210 (i.e., the telephone used by the roaming subscriber).

Command Center 250 returns its response with authentication information via signal path 252 back to Command Center 230 in roaming network 240. Command Center 230 returns the response authentication information via signal path 256 to ingress gateway 220.

After authentication, ingress gateway 220 connects via telephone signal path 262 to the egress gateway 280 in home network 270 for call setup and signaling. Finally, egress gateway 280 completes the call connection via signal path 282 to the destination telephone 290.

After the calling and called parties have completed the call, the billing sequence proceeds. Ingress gateway 220 sends the billing record information via signal path 222 to Command Center 230, which reviews the billing information. In this scenario, since the subscriber at phone card telephone 210 in roaming network 240 is away from his or her home network 270, the Command Center 230 recognizes that the two database ID's are different. Therefore, Command Center 230 sends (i.e., pushes) the billing record information via signal path 232 to Command Center 250 and, at nearly the same time, also sends an acknowledgment (ACK) message via signal path 256 to ingress gateway 220.

The Command Center 230 does not wait for the home network 270 to respond before pushing the billing record information and ACK message back to the ingress gateway 220.

Command Center 250, upon receipt of the billing record information, then sends its ACK message via signal path 252 back to Command Center 230. In addition, the billing information on signal path 232 is identical to the billing information on signal path 222. The ACK messages on signal paths 252 and 256 are completely independent. The ACK message on signal path 252 acknowledges that Command Center 250 back in the home network 270 stored the billing record information successfully. The ACK message on signal path 256 acknowledges that Command Center 230 in roaming network 240 stored the billing record information successfully.

In this two-network scenario, Command Center 230 in the roaming network 240 marks the ingress billing record information as an "inbound" billing record. The Command Center 230 in the roaming network makes a copy of the billing record and pushes it via signal path 232 to Command Center 250 in the home network 270. Command Center 250 in home network 270 then marks its copy of the billing record information as a "roaming copy" billing record. Once Command Centers 230 and 250 receive the billing record information they save the information by making a function call through signal paths 234 and 251, respectively, to store the billing record information in databases 266 and 260, respectively.

The ACK messages indicate that the billing records reached their intended destinations and that there is no need to resend the data. If an error were to occur, a Command Center 230 or 250 would set an error flag in the ACK message indicating that the billing record was not processed properly or not processed at all. An error may occur, for instance, if a Command Center 230 or 250 does not allow roaming, of if the Command Center does not recognize the phone card telephone 210 network subscriber, in which case authentication fails. In addition, there may be an error if the billing record simply was not processed or if the billing record never reached a Command Center 230 or 250 or a database 244 or 260. This might happen, for instance, in the event of a computer crash or a network component or line failure. The error flag is in the form of a field indicating lack of success, and is part of the ACK message. If no error occurs, this field is set to "success."

Figure 3:
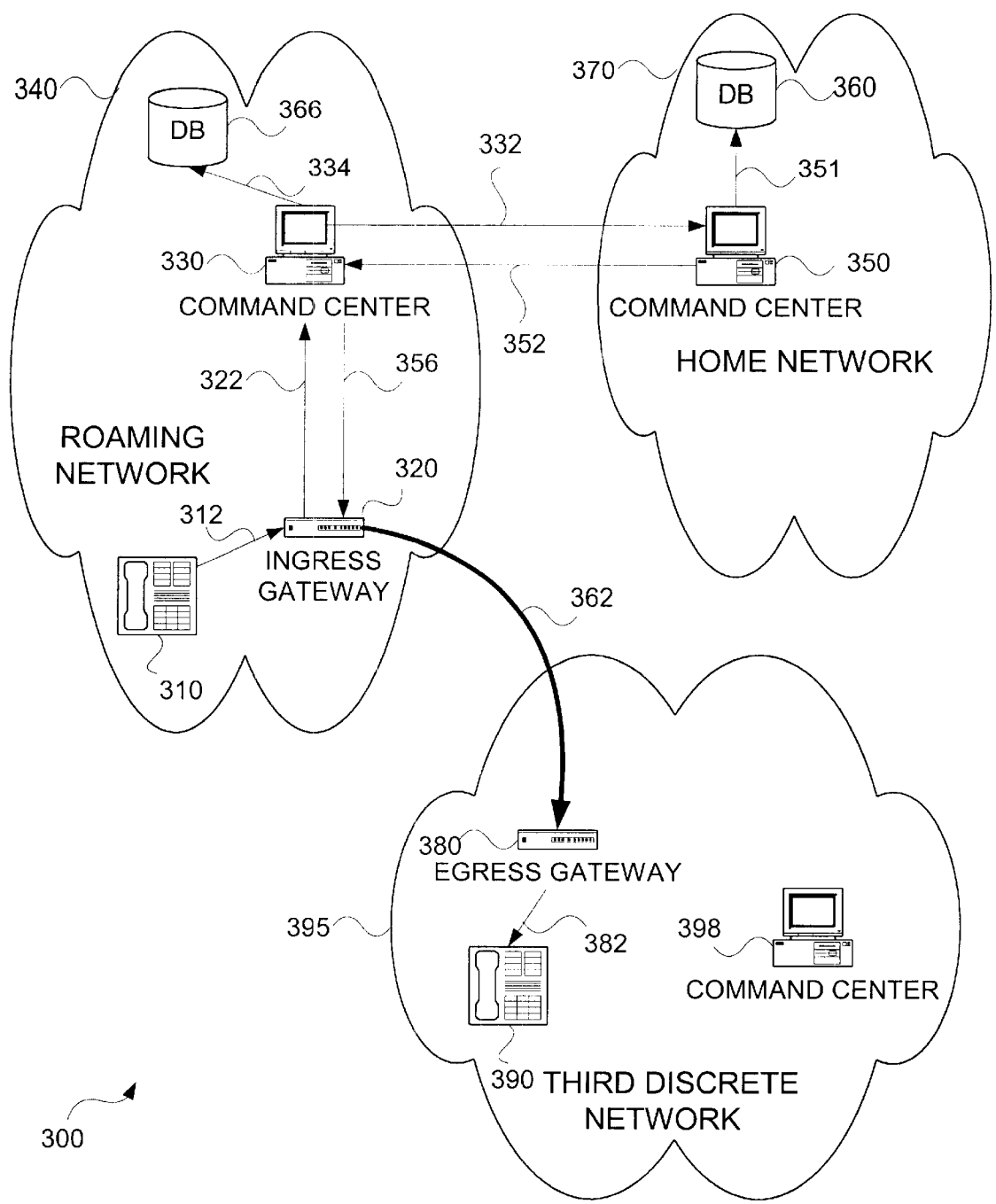
FIG. 3 is a network diagram of a supported roaming scenario in which the source (ingress) gateway resides in the roaming network and the destination (egress) gateway resides in a third discrete network.

FIG. 3 is a diagram of a roaming network 340, a home network 370, and a third discrete network 395 that support a roaming scenario. The roaming network 340 includes a source (ingress) gateway 320 and the third discrete network 395 includes a destination (egress) gateway 380.

A phone card telephone 310 (i.e., a telephone used by a telephone network subscriber to the home network 370, subscriber not shown) initiates a call that is routed for authentication via signal path 312 to ingress gateway 320. Ingress gateway 320, via signal path 322, requests authentication from Command Center 330. The Command Center 330, in turn, requests authentication information via signal path 332 to a Command Center 350 in the home network 370 corresponding to authentication information of the subscriber at phone card telephone 310 (i.e., the telephone used by the roaming subscriber).

Command Center 250 returns its response with authentication information via signal path 352 back to Command Center 330 in roaming network 340. Command Center 330 returns the response authentication information via signal path 356 to ingress gateway 320.

After authentication, ingress gateway 320 connects via telephone signal path 362 to the egress gateway 380 in the third discreet network 395 for call setup and signaling. Finally, egress gateway 380 completes the call connection via signal path 382 to the destination telephone 390.

After the calling and called parties have completed the call, the billing sequence proceeds. Ingress gateway 320 sends the billing record information via signal path 322 to Command Center 330, which reviews the billing information. In this scenario, since the subscriber at phone card telephone 310 in roaming network 240 is away from his or her home network 370, the Command Center 330 recognizes that the two database ID's are different. Therefore, Command Center 330 sends (i.e., pushes) the billing record information via signal path 332 to Command Center 350 and, at nearly the same time, also sends an acknowledgment (ACK) message via signal path 356 to ingress gateway 320.

The Command Center 330 does not wait for the home network 370 to respond before pushing the billing record information and ACK back to the ingress gateway 320.

Command Center 350, upon receipt of the billing record information, then sends its ACK message via signal path 352 back to Command Center 330. In addition, the billing information on signal path 332 is identical to the billing information on signal path 322. The ACK messages on signal paths 352 and 356 are completely independent. The ACK message on signal path 352 acknowledges that Command Center 350 back in the home network 370 stored the billing record information successfully. The ACK message on signal path 356 acknowledges that Command Center 330 in roaming network 340 stored the billing record information successfully.

In this two-network scenario, Command Center 330 in the roaming network 340 marks the ingress billing record information as an "inbound" billing record. The Command Center 330 in the roaming network makes a copy of the billing record and pushes it via signal path 332 to Command Center 350 in the home network 370. Command Center 350 in home network 370 then marks its copy of the billing record information as a "roaming copy" billing record. Once Command Centers 330 and 350 receive the billing record information they save the information by making a function call through signal paths 334 and 351, respectively, to store the billing record information in databases 366 and 360, respectively.

The ACK messages indicate that the billing records reached their intended destinations and that there is no need to resend the data. If an error were to occur, a Command Center 330 or 350 would set an error flag in the ACK message indicating that the billing record was not processed properly or not processed at all. An error may occur, for instance, if a Command Center 330 or 350 does not allow roaming, of if the Command Center does not recognize the phone card telephone 310 network subscriber, in which case authentication fails. In addition, there may be an error if the billing record simply was not processed or if the billing record never reached a Command Center 330 or 350 or a database 344 or 360. This might occur, for instance, in the event of a computer crash or a network component or line failure. The error flag is in the form of a field indicating lack of success, and is part of the ACK message. If no error occurs, this field is set to "success."

FIG. 4 is a database table located in a database of a roaming network Command Center. The database table stores a list of "Roaming Partner Networks," their associated database ID's, and a list of command centers' IP addresses in each network. This list is used by a Command Center upon discovery of a difference between a subscriber's database ID and a Command Center's database ID in the local database. When the two ID's are different, the Command Center searches the list in the database table for the subscriber's "home" network. For example, if the subscriber's database ID is "3" denoting the USA as the home network location, a Command Center with a matching database ID of "3" will be chosen from the list. This chosen command center will be where the "roaming copy" billing record as well as the ACK message will be sent.

The Command Center reviews the billing information, stores a corresponding billing record in a local database, and compares the subscriber's database ID to a Command Center database ID in the local database. If the two database ID's are different then the Command Center searches a list of "Roaming Partner Networks," their associated database ID's, and a list of Command Centers in each network, and forwards a copy, within an acknowledgement (ACK) message, to a Command Center in the home network of the telephone network subscriber. The Command Center in the home network marks the billing record as a "roaming copy" billing record, saves the billing record to a local database, and sends an acknowledgement (ACK) message to the roaming network Command Center.

The invention has been explained above with reference to a preferred embodiment. Other embodiments will be apparent to those skilled in the art in light of this disclosure. For example, the invention is not limited to the embodiments depicted in the two-network scenarios of FIG. 1 and FIG. 2, nor the three-network scenario of FIG. 3. The invention may be implemented in other configurations and/or used with other systems. For example, the invention can be adapted to work with cellular telephones. Therefore, these and other variations upon the preferred embodiments are intended to be covered by the appended claims.

What is claimed is:

1. A method of processing roaming billing record information from a roaming network, comprising:

a phone card telephone initiating a call which is routed to an ingress gateway;

authenticating, setting up, connecting and completing the call;

the ingress gateway sending billing information to a Command Center in the roaming network;

the Command Center reviewing the billing information, storing a corresponding billing record in a local database, and comparing a database identification (ID) of the subscriber to the database ID of the Command Center in the local database and, if the two ID's are different then forwarding a copy, within an acknowledgement (ACK) message, to a Command Center in the home network of the phone card telephone subscriber;

the Command Center in the home network marking the billing record as a "roaming copy" billing record, saving the billing record to a local database, and sending an acknowledgement (ACK) message to the roaming network Command Center.

\* \* \* \* \*